United States Patent [19]

Guillet et al.

[11] Patent Number: 4,965,807
[45] Date of Patent: Oct. 23, 1990

[54] ADAPTABLE LASER APPARATUS

[75] Inventors: Hubert Guillet, Saint Michel Sur Orge; Dominique Vialle, Villecresnes, both of France

[73] Assignee: Micro-Controle, Evry, France

[21] Appl. No.: 350,622

[22] PCT Filed: Aug. 25, 1988

[86] PCT No.: PCT/FR88/00426
§ 371 Date: Mar. 16, 1989
§ 102(e) Date: Mar. 16, 1989

[87] PCT Pub. No.: WO89/02174
PCT Pub. Date: Mar. 9, 1989

[30] Foreign Application Priority Data

Aug. 26, 1987 [FR] France ................ 8711950

[51] Int. Cl.⁵ .......................... H01S 3/08; H01S 3/10
[52] U.S. Cl. ...................................... 372/92; 372/107
[58] Field of Search ............. 372/92, 109, 92, 98, 372/107

[56] References Cited

U.S. PATENT DOCUMENTS 3,569,859  3/1971  Whitney .................... 331/94.5
4,852,107  7/1989  Hamal et al. ............... 372/14
4,852,115  7/1989  Viherkoski et al. .......... 372/92

FOREIGN PATENT DOCUMENTS 0109959  5/1984  European Pat. Off. .
01445    4/1985  European Pat. Off. .
03958    7/1986  European Pat. Off. .
2809007  9/1979  Fed. Rep. of Germany .
2607329  5/1988  France .
2197748  5/1988  United Kingdom ........... 372/4

OTHER PUBLICATIONS

Kaminskii, A. A., Inorganic Materials, vol. 10, No. 12, (Dec. 1974), pp. 1911 and 1912.

Primary Examiner—James W. Davie
Attorney, Agent, or Firm—Fisher, Christen & Sabol

[57] ABSTRACT

A laser apparatus comprising a resonant cavity, which comprises an assembly of two different reflectors and inside which is disposed an active medium capable of generating a radiation under the action of excitation means connected to said active medium. In addition, the apparatus comprises at least one supplementary resonant cavity of structure, similar to the preceding one, comprising an assembly of two different reflectors, and means for controlling the displacement of said resonant cavities making it possible to bring one or the other of said cavities coaxially into alingment with said active medium.

14 Claims, 2 Drawing Sheets

ADAPTABLE LASER APPARATUS

BACKGROUND OF THE INVENTION

The present invention relates to an adaptable laser apparatus, for example capable of emitting a radiation able to have different wave lengths.

The laser apparatus according to the invention is more particularly, although not exclusively, intended for therapeutic applications, but other applications of said apparatus may be envisaged, such as for the treatment and machining of metallic pieces.

In its preferential application, the laser apparatus may emit a radiation having either a wave length of 1.06 micrometer, which is specifically appropriate for the coagulation and haemostasis of human tissues, or a wave length of 1.32 micrometer which is then specifically appropriate for surgery by vaporization of said tissues.

Laser apparatus are already known whose production makes it possible to emit a radiation able to have two specific wave lengths.

For example, document US-A-3 569 859 describes a laser apparatus comprising a plasma tube disposed in a resonant cavity constituted by two reflectors, of which one is totally reflecting, whilst the other is partially reflecting. The plasma tube containing a gas, such as for example carbon dioxide, is connected to a D.C. generator for exciting said gas. Furthermore, a displaceable element made of zinc sulfide may be disposed, coaxially, between the tube and the partially reflecting reflector, and is intended to act as filter.

Thus, when the zinc sulfide element is located outside said cavity, the wave length of the radiation emitted by the apparatus is of the order of 10.6 micrometers, whilst, when the zinc sulfide element is located in the cavity, between the partially reflecting reflector and the tube, the wave length of the radiation emitted by the apparatus is of the order of 9.6 micrometers, as part of the spectrum emitted is selectively absorbed by said filtering element.

Document PCT WO 86/03958 describes a laser apparatus intended for treatments of human tissues. The apparatus is of design substantially similar to that previously described, but comprises, instead of the displaceable filtering element made of zinc sulfide, a reservoir capable of containing a gas and disposed between the plasma tube and a partially reflecting mirror. In this way, when the vacuum is created, by means of a pump, in the reservoir, the wave length of the radiation emitted is of the order of 10.6 micrometers, whilst, when a gas, for example SF6, is injected in the reservoir by appropriate supply means, the wave length of the radiation emitted then corresponds substantially to 9.6 micrometers, the gas SF6 acting as filter for the radiation emitted by the tube.

Document EP-A-0 109 959 also discloses an apparatus of the YAG laser type, for therapeutic applications, and which comprises in particular, as active medium, a bar made of YAG, a reflecting mirror, a partially reflecting mirror and a controllable pivoting prism, disposed between the YAG bar and the reflecting mirror. The bar is connected in particular to a source of energy. This type of YAG laser apparatus is capable of emitting a radiation able to have at least two specific wave lengths, namely either 1.06 micrometer or 1.3 micrometer. Modification of the wave length of the radiation emitted is obtained by appropriate pivoting of the prism, actuated by a lever or the like. Thanks to the addition of an optical fiber to said apparatus, a practician can thus treat different human tissues by the appropriate use of one or the other of the specific wave lengths.

These apparatus, briefly described hereinabove, present in particular the drawback of providing elements supplementary to the laser system proper comprising an active medium and a resonant cavity, in order to allow, by their interposition in the path of the radiation emitted, the modification of the wave length thereof. This consequently brings about problems of alignment, particularly angular, of the reflectors of the resonant cavity with respect to one another, as well as between said reflectors and said active medium, always technically difficult to overcome.

Other laser apparatus capable of emitting a radiation of different wave lengths are also known, particularly by documents PCT WO 85/01445 and DE-2 809 007.

Each apparatus essentially comprises two independent laser sources, generally a YAG laser source and a $CO_2$, laser source, which each emit a radiation of specific wave length. Via means for switching the two laser sources, the user may modify and choose the appropriate wave length of emission. However, these apparatus, since they use two independent laser sources, are expensive, cumbersome and nonetheless complicated, since it is necessary to provide means for aligning the radiations emitted by said sources.

SUMMARY OF THE INVENTION

The present invention has for its object to overcome the drawbacks mentioned hereinabove, and concerns in particular a laser apparatus capable of emitting a radiation of different wave lengths, and which avoids in particular the arrangement of supplementary elements to the laser system proper.

To that end, the laser apparatus of the type comprising a resonant cavity which comprises an assembly of two different reflectors and inside which is disposed an active medium capable of generating a radiation under the action of excitation means connected to said active medium, is noteworthy, according to the invention, in that it comprises at least one supplementary resonant cavity, of structure similar to the preceding one, comprising an assembly of two different reflectors, and in that means are provided for controlling the displacement of said resonant cavities making it possible to bring one or the other of said cavities coaxially to said active medium.

Thus, thanks to the invention, said resonant cavities can be switched, under the action of the control means. Consequently, the apparatus according to the invention dispenses with added ancillary elements or with different laser sources.

If said active medium is capable of emitting a radiation which may have different wave lengths and if each pair of reflectors is adapted to one of said wave lengths, it is seen that the apparatus according to the invention generates a radiation of which the wave length is different depending on whether one or the other of said cavities is in relation with said active medium.

However, the present invention is not limited to this application of change of wave lengths. In fact, it is easily seen that the switching of cavities according to the present invention may be carried out in order to obtain, not several wave lengths, but several operational modes (continuous mono-mode, continuous multi-mode, pulsed, triggered) which necessitate different cavity reflectors and/or supplementary components.

According to another feature of the invention, the assembly of the reflectors of said resonant cavity may be borne by a support capable of being displaced, under the action of the control means, between at least two distinct positions, of which one corresponds to the alignment of the assembly of the reflectors with said active medium, whilst the other of the positions corresponds to the retraction of said assembly with respect to said active medium.

Similarly, the assembly of the reflectors of said supplementary resonant cavity may be borne by a support capable of being displaced, under the action of the control means, between at least two distinct positions, of which one corresponds to the alignment of the assembly of reflectors of said supplementary resonant cavity with said active medium, whilst the other of the positions corresponds to the retraction of said assembly with respect to said active medium.

However, in a preferred embodiment, the assemblies of the reflectors of the resonant cavity and of the supplementary resonant cavity are borne by the same support capable of being displaced between at least two distinct positions, of which one corresponds to an alignment of the reflectors of the resonant cavity with said active medium, and of which the other corresponds to an alignment of the reflectors of the supplementary resonant cavity with said active medium.

This embodiment thus makes it possible to reduce the number of pieces necessary for the displacements of said cavities, and especially to have the same reference of positioning of said cavities since they are mounted on the same support.

Said support bearing the assemblies of reflectors of said cavities is advantageously capable of pivoting, under the action of the control means, about an axis of rotation disposed parallel to the optical axis of the radiation emitted by said active medium. In this way, a simple angular pivoting about said axis makes it possible to present one or the other of said cavities with respect to the active medium. Furthermore, adjustable stop means may be provided on said support, allowing, as a function of the position of the control means, the adjustment of said cavities with respect to said active medium.

In a preferred embodiment, said support is constituted by a rod disposed parallel to the axis of said active medium, and on which are fixed, in the vicinity of its ends, respectively, transverse side elements in which said reflectors are arranged. Said means for controlling the displacement of said cavities may be constituting by at least one jack, or the like.

BRIEF DESCRIPTION OF THE DRAWINGS

The Figures of the accompanying drawing will clearly show how the invention may be carried out. In these Figures, identical references designate similar elements.

DETAILED DESCRIPTION OF THE PREFERRED EMBODIMENTS

The laser apparatus shown in these Figures is intended to emit a radiation whose wave length may be chosen between two values. One of the preferred applications of such an apparatus concerns the medical field, particularly the treatment of human tissues effected by endotherapy.

Figure 1:
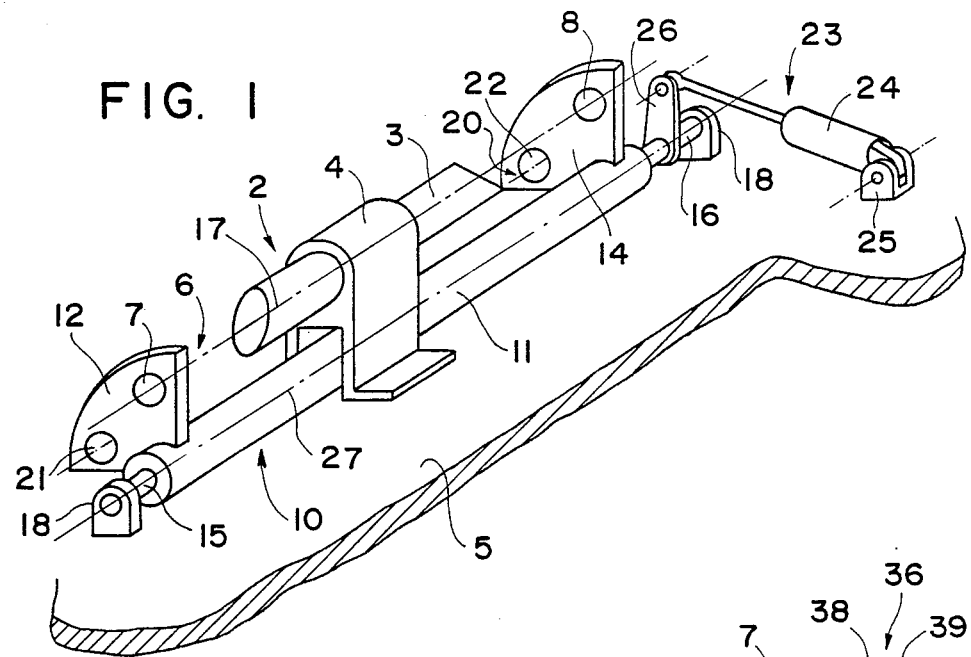
FIG. 1 shows, in a schematic perspective view, an embodiment of the laser apparatus according to the invention, adapted to generate two different wave lengths.

In FIG. 1, the laser apparatus, illustrated schematically, comprises an active medium 2, in the present case a bar 3 of the YAG type, of which the excitation, pumping and cooling means have not been shown, but are well known per se.

The bar 3 is fixedly maintained in an appropriate element 4 fast with a rigid table 5 shown partially. The apparatus comprises a resonant cavity 6 which is constituted by an assembly of two reflectors 7 and 8 of different reflecting power, disposed on either side of said active medium 2. The resonant cavity 6 is borne by a support 10 constituted, in this embodiment, by a rod 11 and two side elements 12 and 14 fixed in the vicinity of the ends 15 and 16 of the rod 11. The latter is arranged parallel to the optical axis 17 of the active medium 2 and the side elements 12 and 14, in the form of angular sector, are each disposed in a plane perpendicular to said rod, and therefore to the optical axis of the active medium 2.

Connection between the side elements 12 and 14 to the rod 11 is effected for example by means of welding. The ends 15 and 16 of the rod 11 are borne by bearings 18 fixed to the rigid table 5. Reflector 7 is disposed in side element 12, whilst reflector 8 is disposed in side element 14.

According to the invention, the laser apparatus comprises a supplementary resonant cavity 20 which is also constituted by an assembly of two reflectors 21 and 22 of different reflecting power, of which at least the partial reflector is different from the partial reflector of the assembly 21, 22. The reflector 21 is disposed in the side element 12, whilst reflector 22 itself is disposed in side element 14. These two resonant cavities 6 and 20 are parallel to each other and are adapted to the wave lengths of emission of the active medium 2.

As may be seen in FIG. 1, an actuator or means 23 are provided for controlling the displacement of the support 10. These means 23 are defined by a jack 24 of which one of the ends is articulated on a fork joint 25 fixed to the table 5, and of which the other end is articulated on a lever 26 fixed in the vicinity of the end 16 of the rod, and disposed, in this embodiment, between side element 14 and the bearing 18 which bears the end 16 of the rod 11.

In this way, when the jack 24 is actuated, it rotates the support 10 to which it is connected by lever 26. Consequently, the rod 11 pivots about its axis of rotation 27 parallel to the axis of the optical medium, causing pivoting of the side elements 12 and 15 bearing the resonant cavities 6 and 20.

The support 10 may therefore pivot about the axis 27 between two distinct positions: a first position for which the reflectors 7 and 8 of the resonant cavity 6 are aligned with the active medium, and a second position for which the reflectors 21 and 22 of the supplementary resonant cavity 20 are aligned with said active medium.

Consequently, the radiation emitted by the laser apparatus according to the invention may have two different, specific wave lengths depending on whether one, 6, or the other, 20, of said cavities is in relation with said active medium 2. Each assembly or pair of reflectors is adapted to generate a radiation of specific wave length, corresponding to the wave lengths of emission of said active medium. In this way, the change of position of said resonant cavities is effected by mechanically simple but precise means, all the more so as said cavities are borne by the same support thus defining a single reference.

FIGS. 2 to 5 bring further precision as to the execution of the embodiment described.

Figures 2, 3:
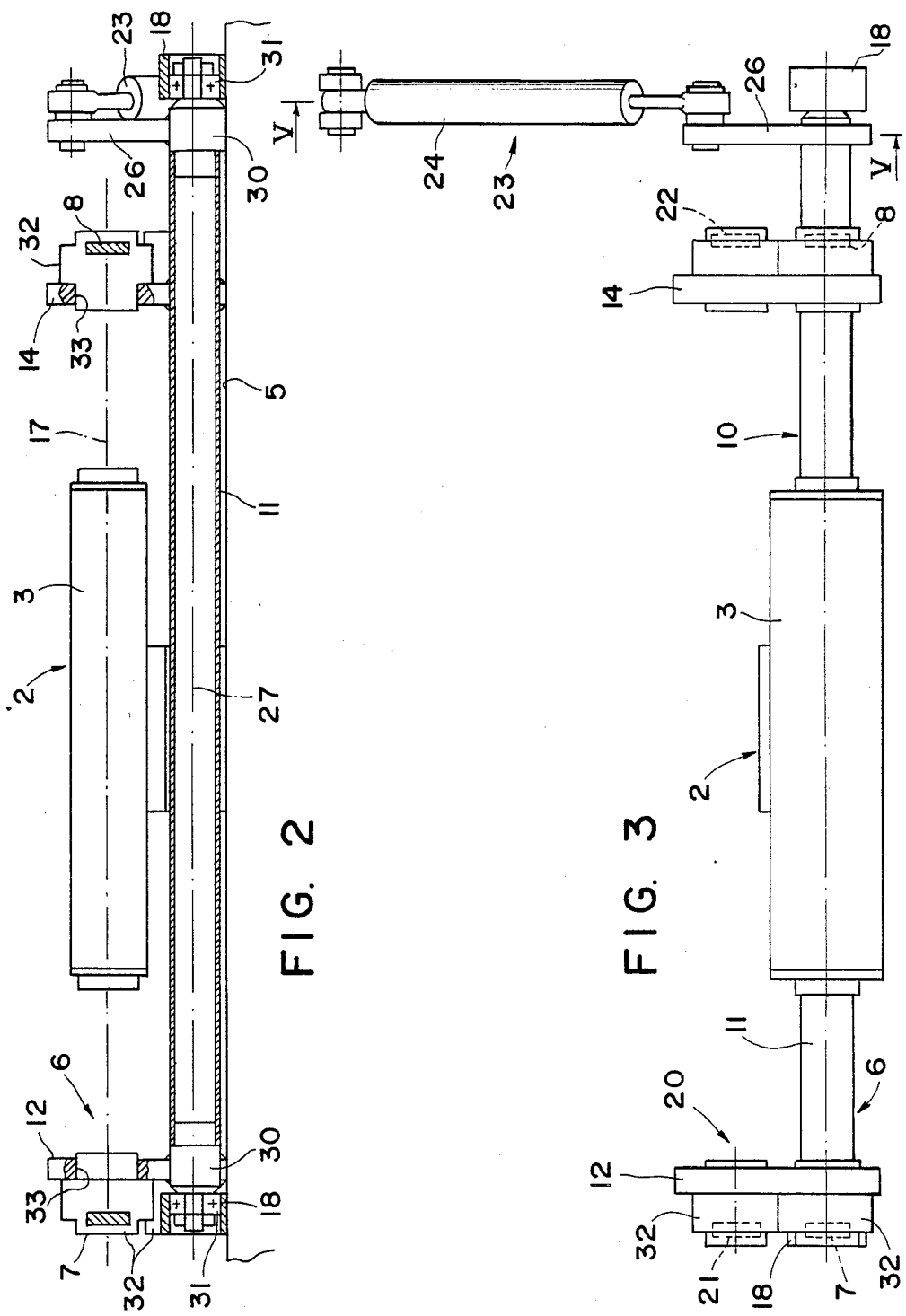
FIG. 2 shows a plan view of the apparatus which shows in particular in section the pivoting support on which said resonant cavities are mounted.
FIG. 3 is a view from above of FIG. 2, which shows in particular the means for controlling the displacement of said support.

FIG. 2 shows in particular in section the support 10 of which the tube 11 is obturated at its ends 15 and 16 by endpieces 30 mounted respectively on roller bearings 31 housed in the bearings 18.

Figure 4:
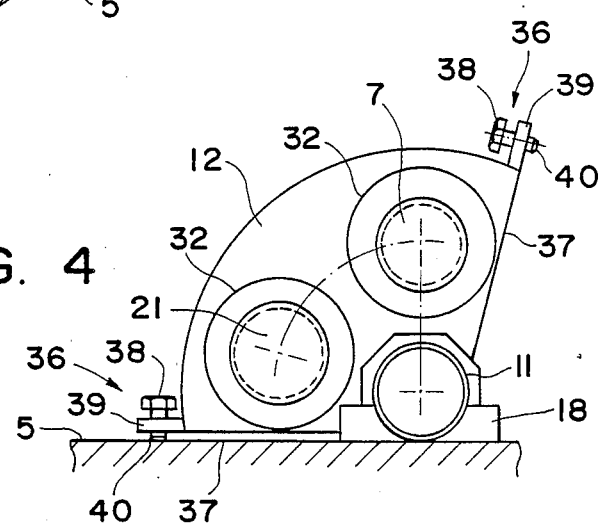
FIG. 4 shows, on an enlarged scale, a side view of the support illustrating in particular the arrangement of the reflectors thereon.

Furthermore, each reflector 7, 8, 21 and 22, as shown in FIGS. 2, 3 and 4, is housed in a removable bush 32 which cooperates with a bore 33 made in the respective side elements. In order to allow adjustment of the alignment of each of the resonant cavities 6 and 20 as a function of the position occupied by the jack 24, adjustable stop means 36, illustrated in FIG. 4, are for example fixed to the side elements 12 and 14. Each side element then presents two stop means 36 disposed approximately in respective extension of the lateral edges 37 of said side element. These stop means are defined, in this particular embodiment and with reference to FIG. 4 illustrating the side element 12, by an adjusting screw 38 screwed in a tab 39 projecting from the corresponding lateral edge, in line therewith. By acting on these screws, the alignment of each cavity with said active medium may easily be adjusted. In this way, when the ends 40 of the screws located on the same lateral edge 37 of the side elements 12 and 14 come into contact with the table 5, the corresponding resonant cavity is then aligned with the axis 17 of the active medium 2.

Figure 5:
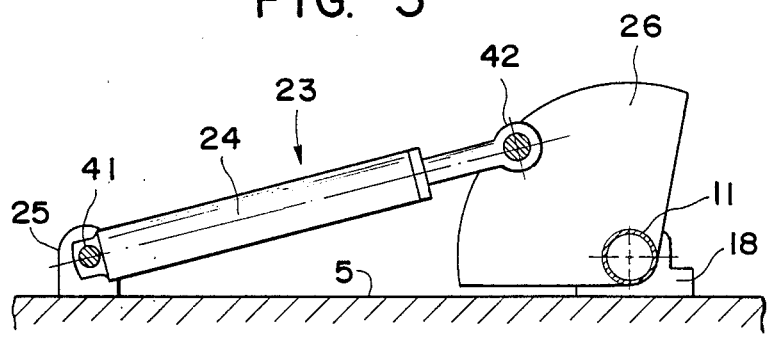
FIG. 5 shows a view along line V—V of FIG. 3 illustrating the means for controlling the displacement of the support.

In FIG. 5, the jack 24, intended for controlling the displacement of the cavities via the support, is articulated, on the one hand, about an axis 41, on the fork joint 25 connected to the table, and, on the other hand, about an axis 42, on the lever 26 which presents the form of an angular sector similar to that of side elements 12 and 14. This lever 26 is for example welded to said rod 11.

In a variant embodiment (not illustrated), the support 10, instead of pivoting about its axis, may be displaced transversely to said active medium, so as to present one or the other of said cavities with respect to the active medium. Moreover, other supplementary resonant cavities may also be arranged as a function of the active medium used.

In its preferential application, the laser apparatus is equipped with an optical fiber cable (not shown) receiving by one of its ends the radiation emitted by the laser system, whilst its other end is provided with an appropriate surgical instrument.

In this way, via a switch or the like acting on the jack which causes the positioning of one or the other of the cavities, the practician may use the appropriate radiation of which the wave length is specifically adapted to a given type of treatment.

For example, the laser apparatus of the YAG type allows the emission, as a function of the resonant cavity disposed opposite the active medium, of a radiation of which the wave length may either be 1.06 micrometer or 1.32 micrometer. The first wave length is specifically adapted to the coagulation and to the haemostasis of the tissues, whilst the second wave length itself is specifically adapted to surgery.

It will be noted that, thanks to the present invention, it is possible to add an adequate crystal or a similar device in a special cavity or outside a normal cavity, in order to obtain a frequency conversion (harmonic 2).

We claim:

1. A laser apparatus comprising:
   a resonant cavity defined by an assembly of two reflectors of different reflecting power with one reflector being a partial reflector, and inside which is disposed an active medium capable of generating a radiation under the action of excitation means connected to said active medium;
   at least one supplementary resonant cavity defined by an assembly of two different reflectors of different reflecting power with one reflector being a partial reflector; and
   an actuator for displacing said resonant cavities making it possible to bring, by pivoting, one or the other of said cavities coaxially in alignment with said active medium:
   said assembly of the reflectors of said resonant cavity being mounted on a support capable of being displaced, under the action of said actuator between at least two distinct positions, of which one corresponds to the alignment of the assembly of the reflectors with said active medium while the other of the positions corresponds to the retraction of said assembly with respect to said active medium;
   said reflectors of said supplementary resonant cavity being mounted on a support capable of being displaced, under the action of said actuator between at least two distinct positions, of which one corresponds to the alignment of the assembly of reflectors of said supplementary resonant cavity with said active medium while the other of the positions corresponds to the retraction of said assembly with respect to said active medium; wherein
   the assemblies of the reflectors of the resonant cavity and of the supplementary resonant cavity are mounted on the same support whereby said support is capable of being displaced between at least two distinct positions, of which one corresponds to an alignment of the reflectors of the resonant cavity with said active medium, and of which 2. A laser apparatus according to claim 1, wherein said support bearing the assemblies of reflectors of said cavities is capable of pivoting, under the control of the actuator about an axis of rotation disposed parallel to the optical axis of the radiation emitted by said active medium.

3. A laser apparatus according to claim 1, wherein an adjustable stop allowing, as a function of the position of the control means, the adjustment of said cavities with respect to said active medium.

4. A laser apparatus according to claim 1, wherein said support is constituted by a rod disposed parallel to the axis of said active medium, and on which are fixed, in the vicinity of its ends, respectively, transverse side elements in which said reflectors are arranged.

5. A laser apparatus according to claim 4, wherein said rod is mounted at its ends by bearings fixed to a table.

6. A laser apparatus according to claim 1, wherein said actuator is constituted by at least one jack, or the 7. A laser apparatus according to claim 6, wherein said jack is articulated at one of its ends on a table while its other end is articulated on said support.

8. A laser apparatus, comprising:
 (a) an active medium (2) supported by a support (5) and capable of generating a radiation along an optical axis (17);
 (b) a first pair of two reflectors (7, 8), one of said reflectors being disposed on one side of said active medium and the other reflector being disposed on the other side of said active medium;
 (c) a second pair of two reflectors (21, 22) one of said reflectors being disposed on one side of said active medium and the other reflector being disposed on the other side of said active medium;
 (d) a rotating body (10, 12, 14) arranged on said support (5), said reflectors (7, 8, 21, 22) of said first and second pairs of reflectors being supported by said rotating body; and
 (e) actuating means (23) for bringing one or the other of said first and second pairs of reflectors coaxially into alignment with said active medium.

9. A laser apparatus according to claim 8, wherein said rotating body has an axis of rotation (27) which is parallel to said optical axis (17).

10. A laser apparatus according to claim 8, wherein adjustable stop means (36) are provided for adjusting the positions of said first and second pairs of reflectors with respect to said optical axis (17).

11. A laser apparatus according to claim 8, wherein said rotating body comprise a rotating rod (11) disposed parallel to said optical axis and on which are fixed, in the vicinity of the respective ends of said rotating rod (11), transverse side elements (12, 14) in which said reflectors of said first and second pairs of reflectors are arranged.

12. A laser apparatus according to claim 11, wherein said rotating rod (11) is borne at its ends by bearings (18) fixed on said support (5).

13. A laser apparatus according to claim 8, wherein said actuating means (23) comprises at least one jack (24).

14. A laser apparatus according to claim 13, wherein one end of said jack (24) is attached to said support (5) and the other end of said jack is attached to said rotating body (10, 12, 14).

* * * * *

UNITED STATES PATENT AND TRADEMARK OFFICE
CERTIFICATE OF CORRECTION

PATENT NO. : 4,965,807

DATED : October 23, 1990

INVENTOR(S) : Hubert Guillet, Dominique Vialle

It is certified that error appears in the above-identified patent and that said Letters Patent is hereby corrected as shown below:

At the end of claim 1, column 6, line 55, the following phrase should be added:

"the other portion corresponds to an alignment of the reflectors of the supplementary resonant cavity with said active medium."

Signed and Sealed this

Thirtieth Day of March, 1993

Attest:

STEPHEN G. KUNIN

*Attesting Officer*    *Acting Commissioner of Patents and Trademarks*